No. 854,626. PATENTED MAY 21, 1907.
H. W. BLAISDELL.
EXCAVATOR.
APPLICATION FILED AUG. 22, 1905.

Witnesses
Harry A. Brooks
Ida Pierce

Inventor
Hiram W. Blaisdell
By
Mignon Ford.
Attorney

No. 854,626. PATENTED MAY 21, 1907.
H. W. BLAISDELL.
EXCAVATOR.
APPLICATION FILED AUG. 22, 1905.

Witnesses
Harry A. Brooks
Ida Pierce

Inventor
Hiram W. Blaisdell
By Mignon Ford
Attorney

UNITED STATES PATENT OFFICE.

HIRAM W. BLAISDELL, OF LOS ANGELES, CALIFORNIA.

EXCAVATOR.

No. 854,626.  Specification of Letters Patent.  Patented May 21, 1907.

Application filed August 22, 1905. Serial No. 275,303.

*To all whom it may concern:*

Be it known that I, HIRAM W. BLAISDELL, a citizen of the United States, residing at Los Angeles, in the county of Los Angeles and State of California, have invented certain new and useful Improvements in Excavators; and I do hereby declare the following to be a full, clear, and exact description of the invention, such as will enable others skilled in the art to which it appertains to make and use the same.

This invention relates to systems of handling material, and particularly to apparatus for removing material from receptacles or vats; and one of the objects of the invention is to provide such an apparatus which will be simple and cheap in construction, while being positive and effective in operation.

It is also an object of this invention to provide an elevator adapted to travel back and forth in a horizontal plane, and to be raised or lowered in a vertical plane and to excavate the material upon the downward or upon the upward movement of the excavating devices, as may be desired.

A further object of the invention is to provide means for automatically effecting the reversal of the horizontal travel of the elevator at predetermined places.

Furthermore an object of this invention is to start the elevator on its return travel, away from the side of the receptacle, before the structure supporting said elevator begins to move, in order to prevent the elevator from being forced against the side of a circular or polygonal receptacle.

With these, and other, objects in view, the invention consists essentially in the construction, combination and arrangement of parts substantially as more fully described in the following specification, and as illustrated in the accompanying drawings, forming part of this application, in which.

Figure 1:
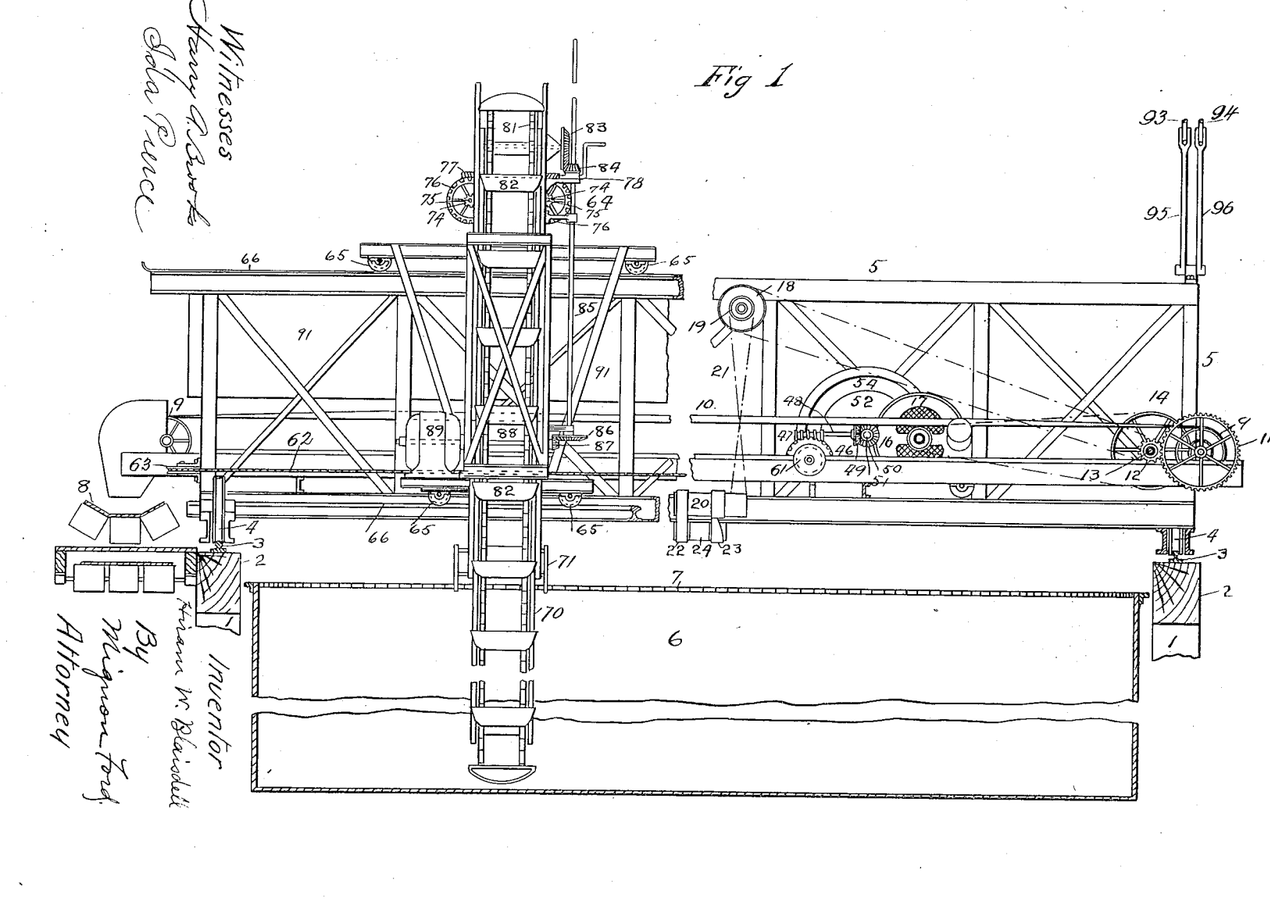
Figure 1 is a front elevational view of the invention and a receptacle, partly broken away.
Figure 2:
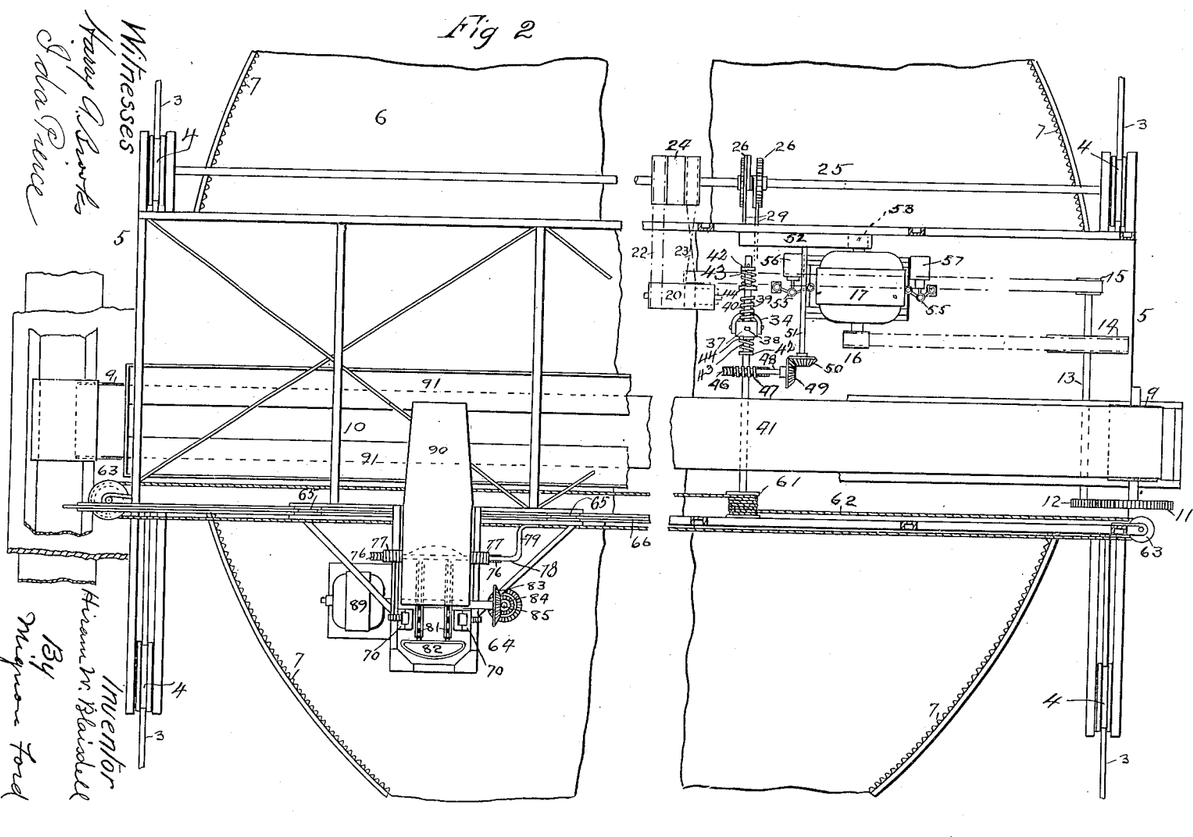
Fig. 2 is a top plan view of the construction illustrated in Fig. 1.
Figure 3:
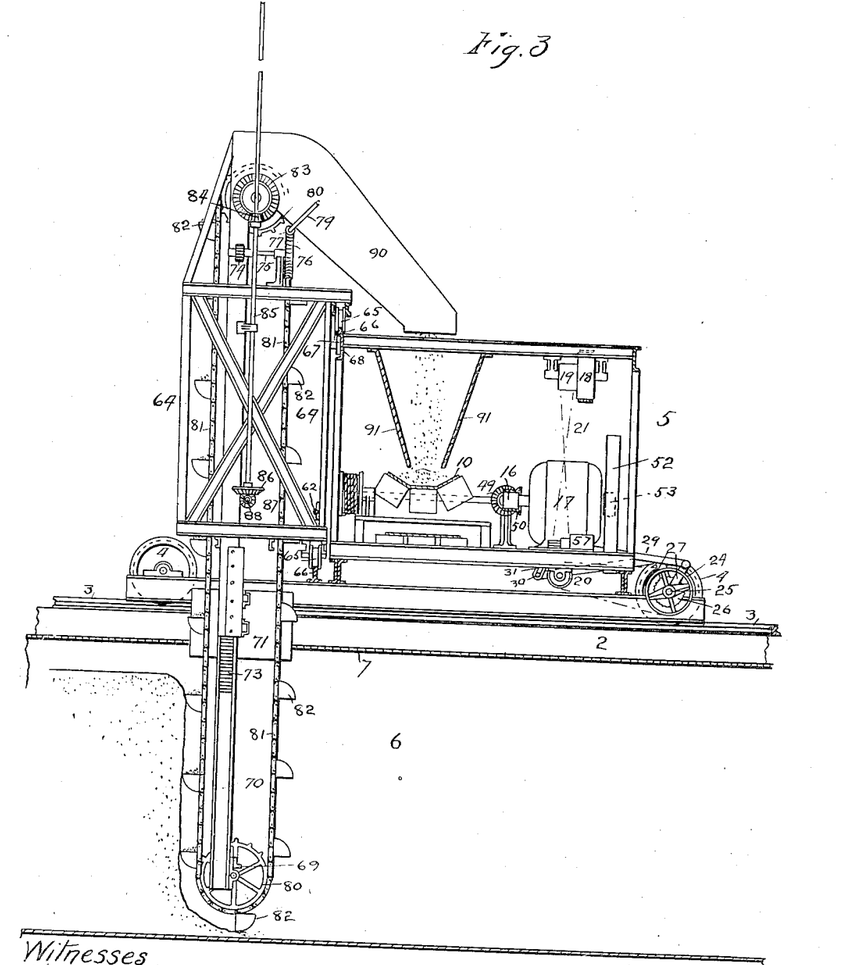
Fig. 3 is a side elevational view, partly in section, showing the invention.
Figure 5:
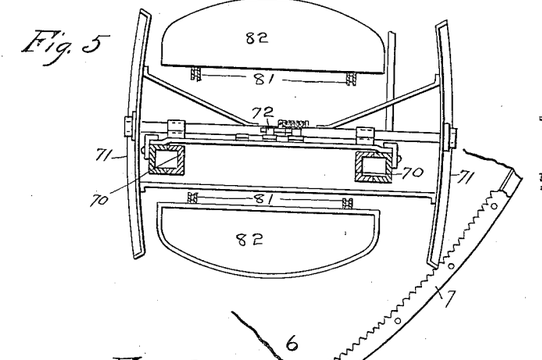
Fig. 5 is a sectional view taken on line 5—5 of Fig. 4.

Referring to the drawings, and particularly to the construction illustrated in Figs. 1, 2 and 3 thereof, the reference character 1 designates upright supports, whereon are secured timbers 2, supporting track rails 3, on which travel the supporting wheels 4, of a traveling structure or bridge 5, constructed to travel above one or more circular or polygonal vats 6, arranged in one or more rows, and which may be provided with a serrated rim or flange 7, Figs. 1, 2 and 5 of the drawings.

Arranged at one side of the timbers 2, and parallel thereto, is a main conveyer 8, substantially as shown in Figs. 1 and 2 of the drawings. At the end of traveling structure 5, remote from the main conveyer, a drum or wheel 9 is mounted, and at the opposite end is a similar device, over which passes an auxiliary conveyer 10. The shaft of the driving pulley 9 is provided with a gear wheel 11, meshing with a pinion 12, on the shaft 13, carrying pulleys 14, and 15, pulley 14 being belted to a pulley 16, on the drive shaft of a movable motor 17, or other driving means, Figs. 1 and 2 of the drawings.

The pulley 15 is belted to a pulley 18, Figs. 1 and 3, the shaft whereof also carries a pulley 19, belted to a pulley 20, by a quarter-twisted belt 21; and from pulley 20, by means of straight belt 22 and cross belt 23, motion in either direction may be communicated to fast pulley 24 on propelling shaft 25.

While the apparatus herein described is performing the operation of excavating, it is preferable to progress the traveling structure slowly and automatically, in order that the instrumentalities carried by the traveling structure may perform their proper functions in the most expedient manner. One form of such separate mechanism for progressing the traveling structure automatically during the operation of the parts thereon is as follows:

On the propelling shaft 25 are secured ratchet wheels 26, Figs. 2, 3, 9 and 12 and on said shaft are movably mounted levers 27, carrying pawls 28, constructed to engage said gear wheels 26 in the usual manner; and slotted links 29 are attached to one end of said levers 27 and are connected, by adjusting bolts 30, with a lever 31 provided with adjusting slots 32, by means of which the point of connection of the links 29 may be varied, thereby regulating the speed at which the supporting wheels 4 are rotated.

In order to provide for the commencement of the travel of the elevator (hereinafter described) away from the edge 7 of the vat, before the traveling structure or bridge is progressed, the ends of the links 29 are slotted, as at 33, Fig. 9, to permit the lever 31 to be moved slightly before propelling the supporting wheels 4, in order to give the elevator a lead or clearance from the receptacle.

Figures 9, 10, 11, 12, 13, 14:
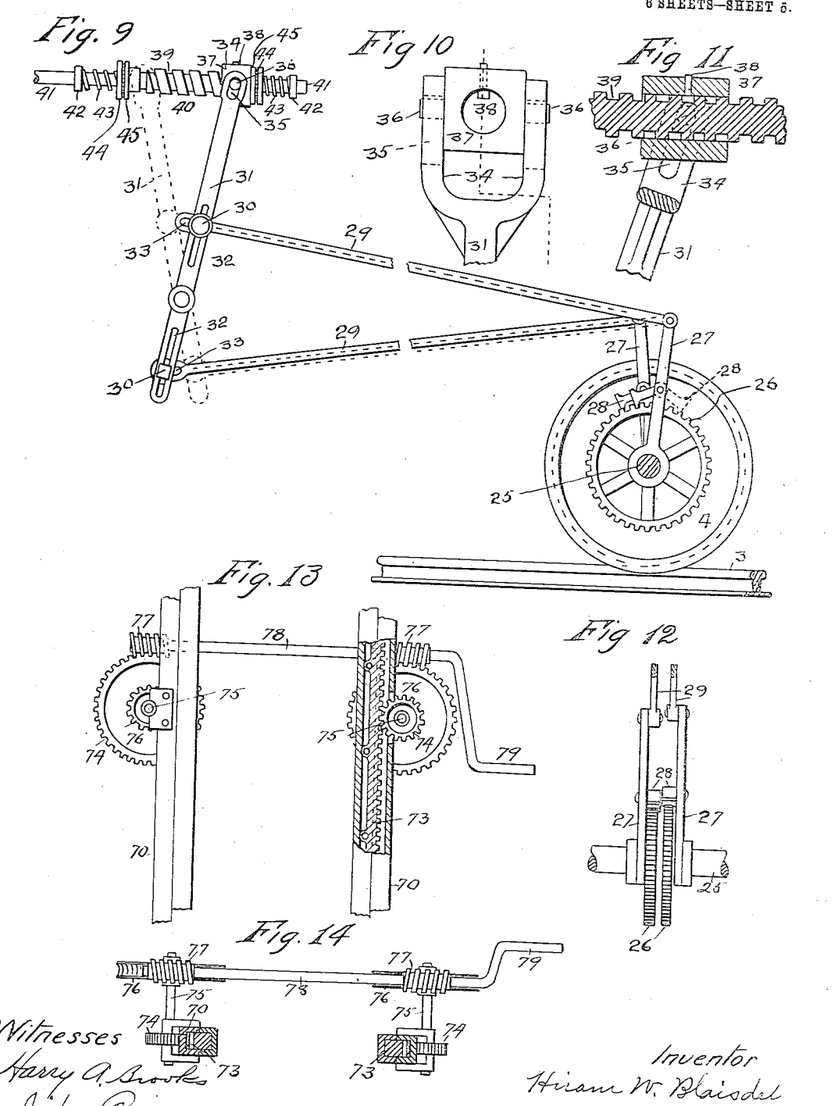
Fig. 9 is an enlarged detail view, showing the means for slowly progressing the traveling structure or bridge forward or backward.
Figs. 10 and 11 are detail, elevational and sectional views respectively of the traveling collar and the yoke.
Fig. 12 is a detail view of a portion of the construction shown in Fig. 9 at the right.
Fig. 13 is a detail view, partly in section, illustrating a means for raising and lowering the elevator.
Fig. 14 is a top plan view of the same.

The lever 31 is provided with a yoke 34, having slots 35, to receive trunnions 36, on a traveling block 37, carrying an internal engaging pin 38, Figs. 10 and 11, constructed to travel in a thread 39 on an enlarged portion 40 of a drum shaft 41, Figs. 2 and 9; and on said drum shaft are mounted collars 42, against which bear springs 43, pressing against anti-friction thrust bearings 44, which are forced against and travel with the portion 40, when the block 37 is out of engagement with them. By this means, the traveling block 37 may be brought against the rotatable members 45 of the thrust bearings, which may then readily turn therewith, without winding the springs 42, said members turning on the anti-friction device between the same and the stationary members.

Mounted on the drum shaft 41 is a worm wheel 46, Figs. 1 and 2, engaged by a worm 47, on a worm shaft 48, carrying a beveled gear 49, meshing with a similar gear 50, on a shaft 51, carrying a channeled friction wheel 52, alternately driven in either direction by friction pulley 53, on the drive shaft of the motor 17.

Figure 15:
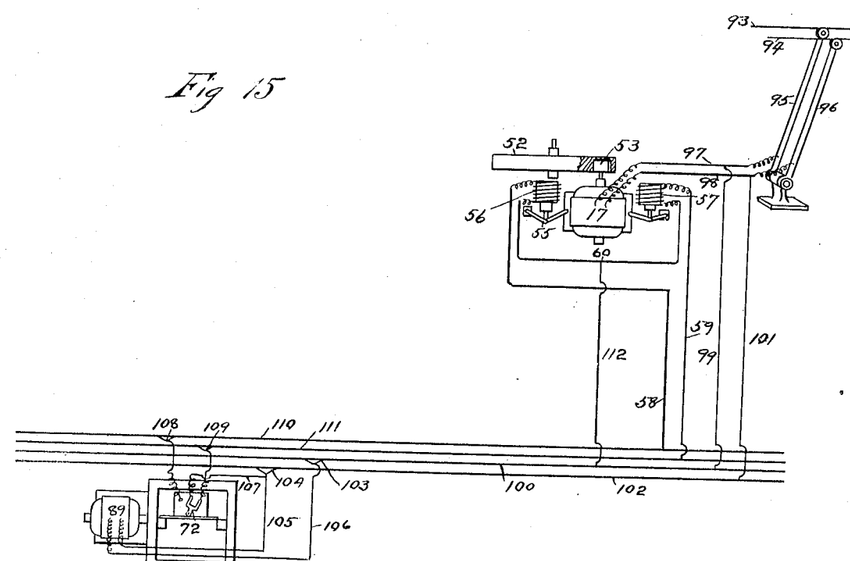
Fig. 15 is a diagrammatic view, illustrating the electrical connections for the several parts.

As shown in Fig. 1 of the drawings, the wheel 52 is provided with an annular channel or groove 54, constructed to receive the friction pulley 53, Figs. 2 and 3, of paper or other suitable material, on the drive shaft of the motor 17; and this motor is mounted on a reciprocating base or support, and is actuated in either direction by toggles 55, Fig. 2, desirably operated by the cores of the solenoids 56 and 57, respectively energized by an electrical current, passing through the connections 58 and 59, said solenoids being electrically connected by a wire 60, Fig. 15, as hereinafter more fully explained.

A drum 61, Figs. 1 and 2, is mounted on the drum shaft 41, and carries a cable 62, which, passing over sheaves 63, at each end of the frame of the bridge 5, is connected at its ends with a traveling elevator frame 64, Figs. 1, 2 and 3 of the drawings.

A general elevator frame 64, of any preferred construction, is mounted on supporting wheels 65, Figs. 1, 2 and 3, adapted to travel on upper and lower tracks 66, secured upon the traveling bridge and deflected upwardly at their extremities to prevent the accidental disengagement of the wheels from said track; and a guard wheel 67, Fig. 3 is constructed to run in a channel 68, to prevent the accidental elevation of the frame 64, during the operation of the elevator, whereby said frame would be raised off the tracks, above referred to.

In order to elevate the entire mechanism from the vat or receptacle, when it is desired to transport the traveling structure from one place of operation to another, a lug or projection 69, Fig. 3, is formed on or connected with the lower portion of the channel iron 70, and is constructed to raise the contact frame 71 when the elevator proper is raised by the mechanism hereinbefore described and shown. By means of this construction, the elevator frame is caused to travel in a horizontal plane longitudinally of the traveling structure, in either direction, by reason of the drum 61 being, by the mechanism described, driven first in one direction and then in another.

Figure 4:
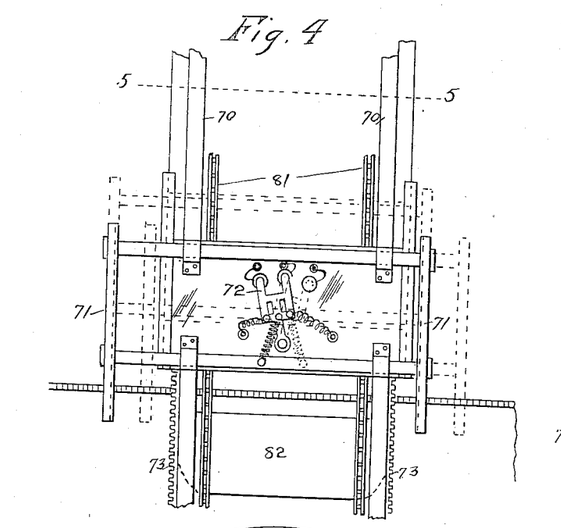
Fig. 4 is an enlarged, fragmental, detail view, illustrating the means of operating the switch.

The elevator frame 64 is provided with a contact frame 71, contacting with the serrated edge 7, Fig. 5, of the receptacle 6, when the elevator sufficiently approaches such edge, whereby the contact frame 71 is moved laterally, as shown in Fig. 4, thereby operating a three-way switch 72, Fig. 4, and energizing the solenoid 56 or 57 as the case may be, (Fig. 2), to operate the toggles 55 connected therewith, to force the motor 17 in the opposite direction; so that the friction pulley 53, on the motor shaft, will be brought into frictional engagement with the opposite face of the channel 54, in the channeled wheel 52, thus effecting the reversal of the mechanism hereinbefore described, and resulting in the travel of the elevator to the opposite side of the receptacle, where a like contact will throw the switch 72 to its initial position and energize the first solenoid, to reverse the mechanism and progress the elevator in its initial direction.

The elevator proper is constructed of channel irons 70, Figs. 3, 4, 5, 6, 13 and 14, wherein are mounted racks 73, engaged by pinions 74, on the shaft 75, also carrying worm wheels 76, meshing with worms 77, on an operating shaft 78, having a crank or handle 79, Figs. 13 and 14 of the drawings, whereby the elevator can be raised or lowered in relation to the elevator frame, to bring the same above the level of the receptacles to permit the transportation of the traveling structure thereover, and to lower the elevator to the plane of the material to be operated upon.

Figure 8:
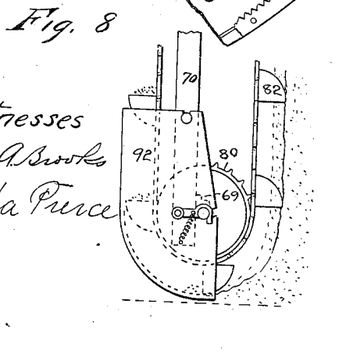
Fig. 8 is a detail view of the lower portion of the elevator, showing the attachment in position thereon and illustrating the manner of removing the material upon the downward movement of the excavating devices.

Sprocket wheels or other devices 80 are mounted on shafts journaled in bearings in the upper and lower ends of the channels 70, Figs. 1, 2 and 8, and carry an endless chain or other device 81, provided with excavating buckets 82, and the shaft of one set of said sprocket wheels is provided with a beveled gear 83, Figs. 1, 2 and 3, constructed to mesh with a beveled pinion 84, feathered on a sliding shaft 85, carrying a bevel gear 86, meshing with a pinion 87, on the drive shaft 88 of a motor 89, or other source of power, Figs. 1 and 2, whereby the excavating devices 82 are actuated.

The material raised by the excavating buckets is discharged into a chute 90, carried by the elevator frame or carriage, and is guided by a converging trough or long hopper 91, Figs. 2 and 3 of the drawing, on to the cross or auxiliary conveyer 10, and is discharged thereby upon the main conveyer, which transports the material to the place of deposit.

When it is desired to operate the excavating devices, in the reverse or downward direction, an attachment or hood 92, Fig. 8 may be connected with the lower portion of the channels 70, the bridge 5 is progressed in a reverse direction until the downgoing lead of the elevator is brought adjacent to the material as shown in Fig. 8, when the material will be excavated by the buckets 82, on the downward movement thereof, and will be retained therein until said devices shall have reached a horizontal plane, as indicated in dotted lines in Fig. 8 of the drawings.

Figure 6:
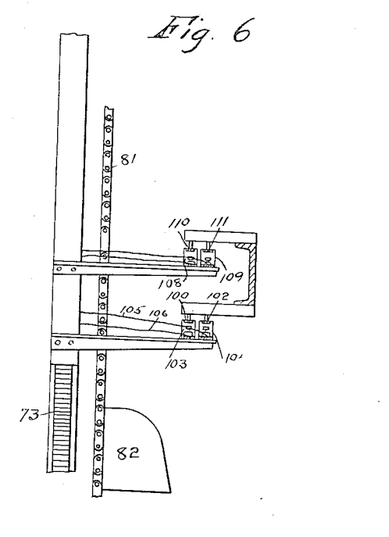
Fig. 6 is an enlarged fragmental, detail view of a portion of the elevator and electrical connections.
Figure 7:
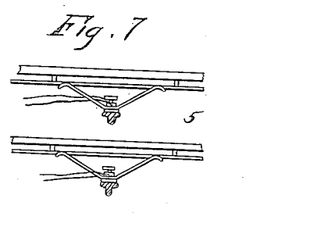
Fig. 7 is a detail view of the traveling contacts or shoes.

Referring to the diagrammatic view in Fig. 15, and to Figs. 6 and 7, it will be seen that the main electric circuit is completed from the trolley wires 93 and 94, the trolley arms 95 and 96, and the connections 97 and 98 to the motor 17, substantially as indicated.

A portion of the current is taken from the connection 97 through the wire 99, to the feeder rail 100, and the wire 98 is connected through wire 101, to another feeder rail 102, and traveling contact devices or shoes 103 and 104 take the current from the feeder rails 100 and 102 to the motor 89, by means of the connections 105 and 106; and the contact points or posts for the switch 72 are respectively connected with contact shoes 108 and 109, adapted to travel on the feeder rails 110 and 111, the former being connected, by the wire 58, with the left hand solenoid and the latter being connected, by a similar wire 59 with the right hand solenoid and said solenoids being connected together by means of a wire 60, united by wire 112, with the feeder rail 100. By means of this arrangement, the switch, by the contact frame on the elevator impinging against the walls of the receptacle, is thrown one way or the other, thereby closing the circuit through one or the other of the solenoids 56 and 57, to operate the toggles connected therewith, to force the motor away from the solenoid energized, and bring the friction pulley 53 in contact with either the rim or center of the channel friction wheel 52, as will be readily understood by those versed in the art.

The operation of this invention will be readily understood from the foregoing description when taken in connection with the accompanying drawing, and the following explanation.

The motor 89 being started, motion is communicated by means of a shaft 88, the bevel pinion 87, bevel gear 86, sliding shaft 85, pinion 84 and bevel gear 83, to the buckets or cutting devices 82 of the elevator.

The straight and twisted belts being on their respective loose pulleys on either side of pulley 24, and the motor 17 being started, the friction pulley is forced against the periphery of the channeled frictional wheel 52, thereby rotating the same in the same direction, and likewise turning the shaft 51, carrying the gear 50, meshing with the gear 49 on the worm shaft 48, and causing the worm 47 therein to revolve the worm wheel 46 and turn the drum shaft 41 in the opposite direction, thereby winding the cable 62 on the drum 61, and moving the elevator or frame to the left, until the contact frame therein engages the serrated edge 7 of the receptacle, and is forced laterally by such engagement. This contact throws the switch 72 in the opposite direction, and deenergizes the previously energized solenoid, and simultaneously energizes the previously deënergized solenoid, which latter operates the toggle connected therewith and forces the motor frame away from the last energized solenoid, thereby bringing the friction pulley 53 into engagement with the center of the channeled friction wheel 52, and turning said wheel in an opposite direction to that first described, with the result of changing the direction of the shaft 51, worm shaft 48 and drum shaft 41, thereby reversing the travel of the elevator. While the elevator is being operated thus, the rotation of the drum shaft 41 turns the threaded portion 40 on said shaft and progresses the traveling block 37, thereby drawing one of the links 29 forward, through the mediation of the lever 31, and forcing the dog or pawl 28 on the levers 27, connected with such rod to engage the ratchet wheel 26, fast on the propelling shaft 25, attached to the supporting wheels 4 of the traveling structure or bridge and progressing the bridge.

By means of this construction the traveling structure or bridge is automatically progressed slowly in a forward direction until the pin 38 in the traveling block shall have reached the end of the thread on the portion 40, when said block will contact with the thrust bearing 44 and compress the spring 36.

When the link 29 and lever 27 before mentioned, are moving in a forward direction the other link and lever are moving in a rearward direction, the pawl carried by the latter lever running or slipping over the cogs or teeth in the ratchet wheel 26, until the rotation of the drum shaft 41 is reversed, by the means just hereinbefore explained, whereupon the collar 37 will travel in reverse direction by the engagement of the pin 35 thereof with the threads 39 on the portion 40, which is now traveling in a reverse direction. This reverse travel of the block will return the first mentioned lever in a rearward direction, and progress the latter lever in a forward direction, thereby producing an intermittent revolution of the supporting wheels 4, irrespective of the direction in which the collar 39 is traveling.

When it is desired to move the traveling structure or bridge from one receptacle to another, the dogs or pawls 28 are thrown out of engagement with the ratchet wheels 26, and the solenoids are deënergized, and contact between the friction pulley 53 and the friction wheel 52, is released and the motor 17 is started, thereby imparting motion to the pulley 14, the shaft 13, the pulley 15 on said shaft, the band wheel 18, the pulley 19, through the twist belt 22 to the pulley 20, on the shaft of the pulley 20, through the straight or twisted belt to the fast pulley 24 on the propelling shaft 25.

Claims—

1. A traveling structure provided with an actuating shaft, an elevator having a cable connected with said shaft, a worm wheel on said shaft, a worm shaft carrying a worm meshing with said worm wheel, a friction wheel driving said worm shaft, and a motor carrying a friction pulley constructed to drive said wheel in either direction, whereby said elevator is caused to travel back and forth.

2. A traveling structure provided with propelling mechanism, an elevator supported on said structure, automatic means for progressing said elevator longitudinally of said structure and devices for effecting the reversal of said elevator progression.

3. A traveling structure provided with propelling mechanism, an elevator supported on said traveling structure, automatic means for reciprocating the elevator in a transverse direction and mechanism for effecting the reverse movement of the elevator in advance of the movement of the traveling structure.

4. A traveling structure provided with propelling mechanism, an elevator supported on said traveling structure, automatic means for moving said elevator forward and back in a transverse direction and automatic means to start said traveling structure after the movement of said reciprocating elevator.

5. A traveling structure provided with propelling mechanism, an elevator supported on said traveling structure, a drum shaft having connection therewith and with said elevator and means for operating said drum shaft to start said elevator in a reverse direction in advance of said propelling mechanism.

6. A traveling structure provided with propelling mechanism, receptacles, an elevator, means for effecting the transverse travel of said elevator and devices for automatically reversing said travel by contact with said receptacle.

7. A traveling structure provided with propelling mechanism, circular receptacles, a reciprocating elevator, means for effecting the reciprocation thereof and instrumentalities to start said means in advance of said propelling mechanism to effect the clearance of said elevator from said receptacle.

8. A traveling structure provided with propelling mechanism, receptacles, an elevator, means for reciprocating said elevator and contact devices connected with said elevator constructed to contact with said receptacles and effect the reversal of the transverse travel of said elevator.

9. A traveling structure provided with an elevator, a motor, actuating mechanism driven by said motor to effect the transverse travel of said elevator, contact devices and connection between said motor and devices, whereby the reversal of said transverse travel of said elevator is accomplished.

10. A traveling structure provided with an elevator, means for effecting the transverse travel of said elevator, a motor to drive said means, receptacles, contact devices connected with said elevator constructed to contact with said receptacles to effect the reversal of the transverse travel of said elevator.

11. A supporting traveling structure provided with an elevator, a movable motor, actuating mechanism driven by said motor to effect the transverse travel of the elevator, an electric switch, electrical connections between said motor and switch, and means for automatically throwing said switch at the limit of the transverse travel of said elevator in either direction.

12. A supporting traveling structure provided with a motor, actuating mechanism driven by said motor to effect the transverse travel of the elevator, an electric switch, electrical connections between said motor and switch and contact devices carried by said elevator to operate said switch at the limit of the travel of said elevator in either direction.

13. A traveling structure provided with an elevator, means to make effective the operation of the elevator in the upward direction and an attachment for said elevator to make effective the operation of said elevator in the downward direction.

14. A traveling structure provided with an elevator, mechanism to operate said elevator upon material in a rising direction and means to effect such operation of said elevator in the descending direction.

15. A traveling structure provided with means for effecting the progression thereof, an elevator supported on said structure, mechanism for effecting the travel of said elevator in a horizontal plane, and means for automatically reversing the direction of said elevator at the limit of its travel.

16. A traveling structure provided with an elevator, automatic contact means for effecting the travel of said elevator in a horizontal plane, devices for raising and lowering said elevator in a vertical plane and mechanism for operating said elevator to raise material.

17. A traveling structure provided with an elevator, automatic contact means for effecting the transverse travel of the elevator back and forth, and adjustable mechanism for starting and stopping the progression of said structure after said elevator has begun its reverse travel.

18. A traveling structure provided with an elevator, means for raising and lowering said elevator, automatic contact devices for effecting the transverse travel of the elevator forward and back, means for starting and stopping the progression of said traveling structure relative to the transverse travel of said elevator.

19. Receptacles, a traveling structure supporting an elevator, means for raising and lowering said elevator, automatic contact devices for effecting the transverse travel of the elevator forward and back, a conveyer on the traveling structure for receiving material from the elevator, means for starting and stopping the progression of said traveling structure relative to the transverse travel of said elevator.

20. A traveling structure provided with propelling mechanism, an elevator, automatic contact means for reciprocating the elevator in a transverse direction, mechanism for effecting the reverse movement of the elevator in advance of the movement of the traveling structure, a conveyer on the traveling structure receiving the material from the elevator.

21. Receptacles, a traveling structure provided with propelling mechanism, an elevator supported on said traveling structure, automatic contact means for moving said elevator forward and back in a transverse direction, a conveyer on said traveling structure receiving material from said elevator, and means to start said traveling structure after the commencement of the forward or backward motion of said elevator.

22. Receptacles, a traveling structure provided with propelling mechanism, an elevator supported on said traveling structure, means for raising and lowering said elevator, automatic contacting means for effecting the transverse travel of said elevator, devices for automatically reversing said traveling structure for receiving material from said elevator, and means for effecting the reverse movement of the elevator in advance of the movement of the traveling structure.

23. A traveling structure provided with propelling mechanism, receptacles, an elevator supported by said structure, means for effecting the transverse travel of said elevator, devices for automatically reversing said travel and a conveyer for receiving material from said elevator.

24. Receptacles, a traveling structure provided with propelling mechanism, an elevator supported by said structure, means for raising and traversing said elevator, automatic means for effecting the transverse travel of said elevator and devices for reversing said travel.

25. Receptacles, a traveling structure provided with propelling mechanism, an elevator supported by said structure, means for raising and lowering said elevator, automatic means for effecting the transverse travel of said elevator, devices for reversing said travel and a conveyer on said traveling structure for receiving material from said elevator.

26. A traveling structure provided with an elevator traveling longitudinally thereof, automatic devices for effecting the reversal of said travel and means for raising said devices.

27. A traveling structure provided with propelling mechanism, an elevator supported by said structure, means for effecting the transverse travel of said elevator, devices for automatically reversing said travel, a conveyer on said traveling structure for receiving material from said elevator and a conveyer on fixed supports for receiving material from said conveyer on said traveling structure.

In testimony whereof, I have signed my name to this specification, in the presence of two subscribing witnesses at Los Angeles, in the county of Los Angeles, State of California, this 15th day of August, A. D. 1905.

HIRAM W. BLAISDELL.

Witnesses:
ARCHIBALD A. TALMAGE,
WALLACE D. THURSTON.